UNITED STATES PATENT OFFICE.

JOHN B. READ, OF TUSCALOOSA, ALABAMA.

IMPROVEMENT IN THE MANUFACTURE OF PAPER.

Specification forming part of Letters Patent No. 51,751, dated December 26, 1865.

*To all whom it may concern:*

Be it known that I, JOHN B. READ, of the town and county of Tuscaloosa, and State of Alabama, have discovered the applicability of the stalks of the common okra-plant, (*Hibiscus esculentus*,) including the fibrous, the ligueous portions, and the pith of the entire plant, to the manufacture of paper and papier-maché, of which the following is a specification.

The nature of my invention consists in so breaking up and grinding together, &c., the fibrous, the ligneous portion, and the pith of the entire okra-plant (*Hibiscus esculentus*) as to furnish a uniform mass readily available for the manufacture of paper, papier-maché, &c., whether used alone or in combination with other material.

To enable others skilled in the art to make use of my discovery, I will proceed to describe how it may be made available.

The stalks of the okra-plant above may be used for paper-making at any time after their maturity; but by delaying their collection till October they will be drier and more readily broken up, bleached, &c. About October, then, the stalks of the okra-plant are to be pulled up by the roots and left to dry in the sun for a few days. The next step is to provide an ordinary thrashing-machine with a little more space between the bars than it requires for small grain. The stalks are to be passed through this machine, which will rid them of dirt, the seeds, and decayed leaves, and besides will so break or hackle them as to fit them for the boiling and bleaching processes. After this cleansing and hackling operation the stalks are to be boiled the usual number of hours in lime-water and afterward in the usual solution of carbonate soda. At this stage the mass may be bleached by boiling in a solution of chloride of lime, or by being subjected in closed rotating vessels to chlorine gas. After a careful washing in clear water to get rid of the chemicals used above, the mass may be passed into the beating-machine, a few hours' trituration in which will yield a mass that may be readily drawn out into excellent paper for all purposes, or may be used for the manufacture of papier-maché compounds, &c.

What I claim as my discovery, and desire to secure by Letters Patent, is—

The applicability of the stalks of the okra-plant, (*Hibiscus esculentus*,) including the fibrous, the ligneous portion, and the pith of the entire plant, to the manufacture of paper, papier-maché, and its compounds. This is virtually a combination of dissimilar materials which I claim, whether the resulting paper mass be used alone or in combination with other materials.

JOHN B. READ.

Witnesses:
EDM. F. BROWN,
T. R. BYRNES.